No. 793,866. PATENTED JULY 4, 1905.
F. L. O. WADSWORTH.
MANUFACTURE OF SHEETS OF GLASS.
APPLICATION FILED SEPT. 29, 1903.
2 SHEETS—SHEET 1.
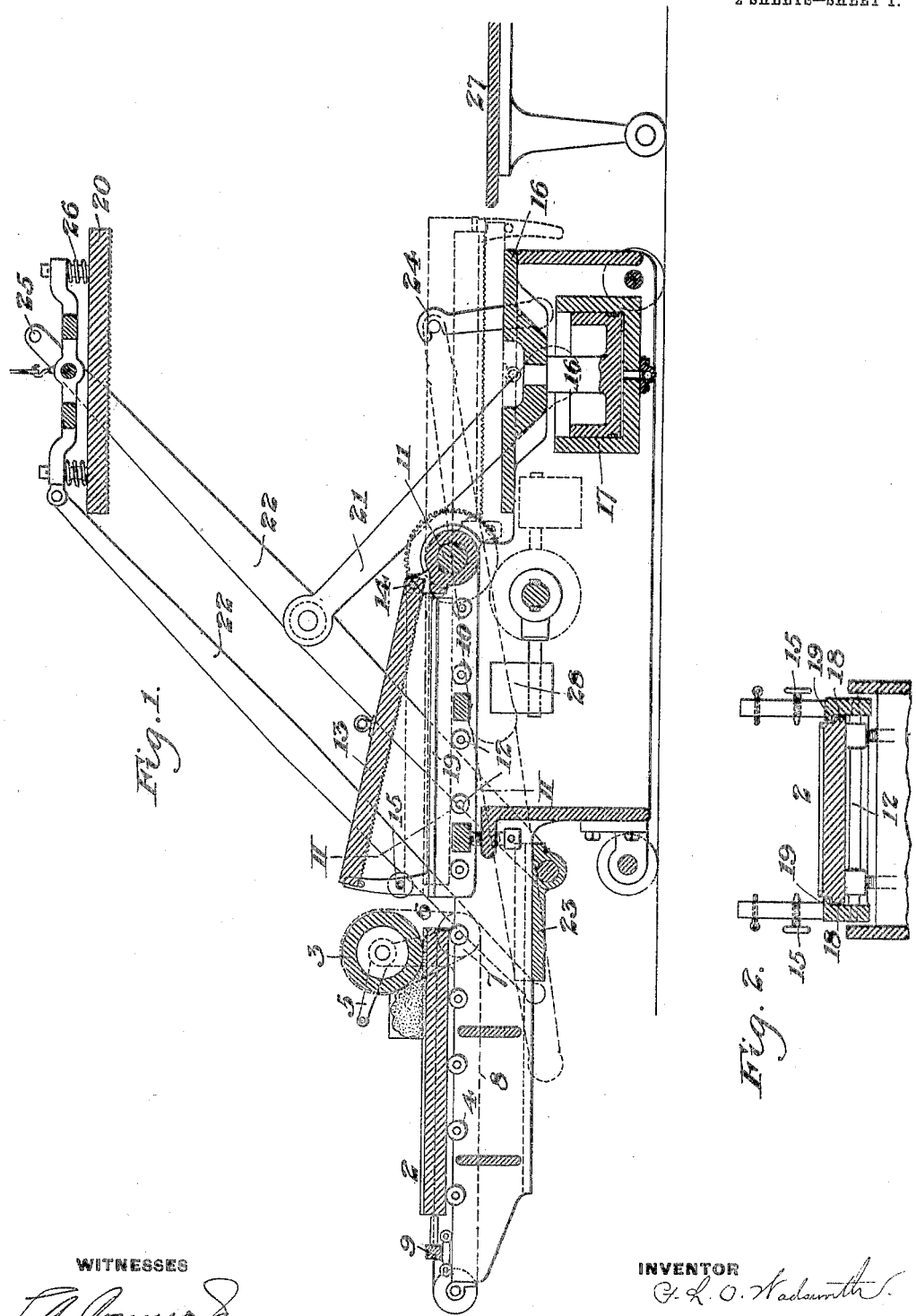
WITNESSES
INVENTOR No. 793,866. PATENTED JULY 4, 1905.
F. L. O. WADSWORTH.
MANUFACTURE OF SHEETS OF GLASS.
APPLICATION FILED SEPT. 29, 1903.
2 SHEETS—SHEET 2.
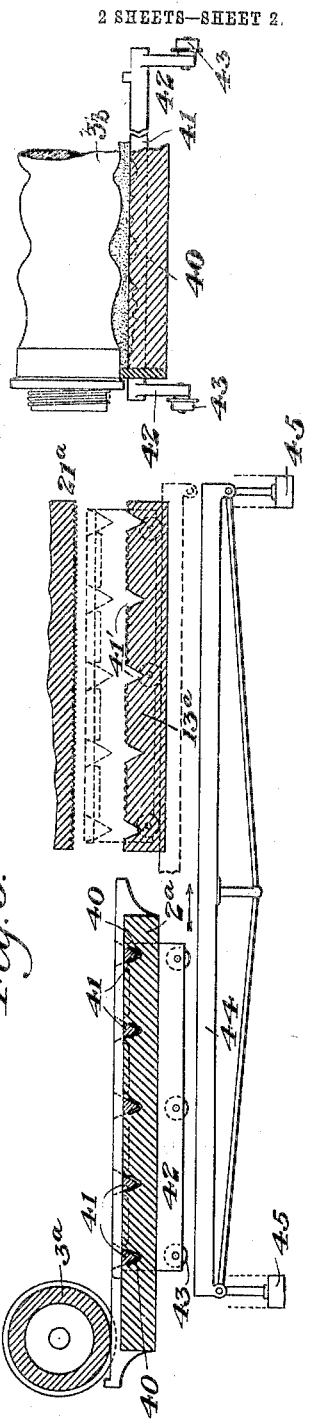
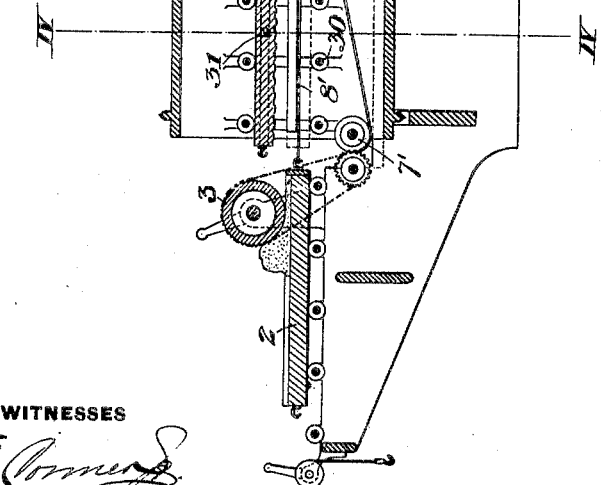
WITNESSES
INVENTOR
F. L. O. Wadsworth No. 793,866.

Patented July 4, 1905.

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, OF MORGANTOWN, WEST VIRGINIA, A CORPORATION OF WEST VIRGINIA.

MANUFACTURE OF SHEETS OF GLASS.

SPECIFICATION forming part of Letters Patent No. 793,866, dated July 4, 1905.

Application filed September 29, 1903. Serial No. 175,027.

*To all whom it may concern:*

Be it known that I, FRANK L. O. WADSWORTH, of Allegheny, Allegheny county, Pennsylvania, have invented a new and useful Improvement in the Manufacture of Sheets of Glass, of which the following is a full, clear, and exact description, reference being had to the accompanying drawings, forming part of this specification, in which—

Figure 1 shows in side elevation, partly in longitudinal section, apparatus adapted for the practice of my invention. Fig. 2 is a cross-section along the line II II of Fig. 1, showing the supporting-table in section and the figured table turned back. Fig. 3 is a vertical longitudinal section of a modified construction of the apparatus. Fig. 4 is a vertical cross-section on the line IV IV of Fig. 3. Fig. 5 is a longitudinal section of part of a machine, showing a third modification. Fig. 6 is an elevation showing a modified construction of the forming-roll adapted to distribute the glass in the initial formation of the sheet, so that it will conform in volume at its different parts to the shape of the pattern which is to be impressed upon it.

My invention consists in a new method in which the glass sheet is first formed as a whole out of contact from the surface on which it is finally shaped and is then transferred to such shaping-surface without sliding it edgewise thereon and shaped on one or both sides, so as to receive its ultimate form.

The invention may be carried out with apparatus constructed in various ways. I have shown several forms of such apparatus in the drawings; but those skilled in the art may be able further to modify them to suit the requirements of the particular kinds of sheet which are to be manufactured.

In Fig. 1, 2 is the table on which the glass sheet is initially rolled by means of a forming-roll 3, which may be mounted in stationary bearings, and the table is mounted on rollers 4, so that it may be caused to travel under the roller, and thus to form into a sheet the mass of plastic glass which is charged upon it in the rear of the roller. A convenient means of moving the table is shown in the drawings. The roll is rotated by a handle 5 and is connected by a sprocket-wheel on its axis and a sprocket-chain 6 with a drum 7, from which an endless chain 8 extends to a pusher-bar 9 at the rear of the table, so that when the roll is driven the pusher-bar will push the table before it beneath the roll. In advance of the roll 3 is a transfer-frame 10, pivoted on an axis 11 and preferably provided with antifriction-rollers 12, upon which the table travels when it passes the roll. When the sheet is completely formed, it rests upon the table 2, and the table is carried by the transfer-frame. When in that position, a second table 13, having a figured surface, is lowered upon the surface of the glass sheet and is confined against the same at one end by a detachable pivot-pin 14, which connects it to the frame 10, and at the other end by a detachable catch or screw 15. The table 13 being thus secured to the frame 10 and the original table 2, with the glass sheet thereon, being between the frame 10 and the table 13, the frame 10 is turned through one hundred and eighty degrees on its axis 11, so as to bring it into the position shown by dotted lines in Fig. 1, with the table 13 resting upon the surface of a plunger 16 of a cylinder 17. The frame 10 is then detached from the table 13 by retracting the screws 15 and detaching the pivot 14, whereupon the frame 10 may be turned back on the axis 11 into its original position, the table 2 being carried with it and being held during the transfer by the engagement of lateral tongues 18 on that table with flanges 19 on the frame. The table 2 may then be retracted upon the rollers 4 to its original position. The table 13 is now resting upon the plunger 16 with the glass sheet lying exposed upon its patterned surface. The next operation is to lower upon the surface of the glass a pressing-die 20, which is carried upon swinging arms 21 and 22, the arms 22 being parallel and connected at their lower ends to a slide 23, so that the pressing-die will move in vertical lines downward upon the glass. When the pressing-die 20 is thus brought upon the surface of the glass, it is held by a hook 24, attached at one end to the frame of the machine and engaging detachably at the other end a pin 25, which may be on one of the arms 22. The plunger 16 is then projected and presses the glass between the patterned surfaces of the table 13 and die 20, impressing the pattern upon both sides of the glass, or when one of these parts is plain the pattern will be impressed upon one side only. The pressing-die 20 is preferably backed by springs 26. The hook 24 is then detached from the pin 25 and the pressing-die raised from the glass, whereupon the glass may be transferred from the table 13 to a suitable receiving-table 27. The table 13 is then transferred to its original position (shown by full lines in Fig. 1) by turning the frame 10 over upon this table, securing it to the table by the pivot-pin 14 and screws 15, and then turning the frame back to its original position. The motion of the frame is facilitated by a counterweight 28, connected by gearing to the axis 11 and adapted to turn therewith, the two extreme positions of the counterweight being indicated in Fig. 1 by dotted and full lines, respectively.

In the modification shown in Figs. 3 and 4 I illustrate other means by which the glass after it has been rolled into sheet form may be transferred to the pressing and figuring surface. In this case the table 2 is adapted to be pulled under the roll 3 by a rope 8', which winds upon a drum 7', the latter being driven by sprocket mechanism from the roll 3. By means of this chain the table is drawn under the roll and carries the sheet into a rotating cylindrical frame 29, in which it is supported by rollers 30 and is held in place by flanges 19' on the frame engaging tongues 18' on the table. When the table is within the frame, a second table 13', which is also supported within the frame by eccentrics 31, is lowered upon the glass by turning the eccentrics. The frame is then rotated on its longitudinal axis through one hundred and eighty degrees, so as to reverse the positions of the tables 2 and 13' and to bring the table 2 uppermost and the table 13' directly above the rollers 32. The table 13', carrying the glass, is then lowered upon the rollers 32 by reversing the eccentrics, the table 2 being meanwhile supported by the tongues 18' and flanges 19', and the table 13' is then drawn, by means of a chain 33, out of the cylindrical frame 29 and upon a pressing-head 34, the eccentrics 31 being set in longitudinal grooves at the edges of the table 13', so as to permit the removal of the latter. The pressing-head 34 is vertically movable in a frame, which carries a pressing-die 20', backed by springs 26', the motive power being supplied by a cylinder 35 and piston 36, connected with the head by levers 37 and 38. When the piston 36 is projected, the pressing-head 34 is raised with the table 13', thus bringing the glass into contact with the pressing-die 20' and impressing the pattern of the die and table upon the opposite faces of the glass. The head 34 may then be lowered, the table 13' pulled forward upon rollers 39, where the glass may be removed and the table then pushed back within the cylindrical frame 29, the latter turned back one hundred and eighty degrees, and the table 2 pushed to the rear of the roll 3 to receive another charge of glass.

In the apparatus shown in Fig. 5 the glass is rolled upon a stationary table $2^a$ by a traveling roll $3^a$. The table $2^a$ has on its surface a series of grooves 40, in which fit cross-bars 41, which during the rolling operation are flush with the surface of the table. These cross-bars are fixed to and form part of a vertically-movable frame 42, which extends under the table, where it is provided with wheels 43, adapted to travel upon a lifting-track 44, which may be moved vertically by cylinders 45. When the glass sheet has been rolled, the track 44 is lifted by means of the cylinders, thus raising the frame 42, lifting the cross-bars 41 from their grooves, and elevating from the table the glass sheet, which is then carried by the cross-bars. The frame 42 is then moved in the direction of the arrow on the elevated track 44 and carries the glass over a second table $13^a$, having a figured surface and also provided with grooves 41' for the reception of the cross-bars. The track is then lowered, so as to cause the cross-bars to enter the grooves and to deposit the sheet of glass upon the patterned surface of the table. Thereupon by appropriate mechanism (not shown) the table $13^a$ may be moved toward a pressing-die $21^a$ and the glass pressed between them to be figured upon both surfaces.

In Fig. 6 I show means for forming a sheet having different thicknesses or volumes of glass at different points to be used with dies of variable contour. For this purpose the forming-roll $3^b$ is corrugated, so that the ribs formed thereby on the glass shall match with those portions of the pressing-die which have the deeper pattern.

It will be apparent that although each step of my method is completed before the next step is begun these steps may be performed in continuous succession.

I claim—

1. The method of forming glass sheets which comprises three successive steps each of which is completed before the next step begins, namely, first forming the sheet; second, transferring it to another supporting-surface; and third, pressing it between said surface and an opposing die-surface; substantially as described.

2. The method of forming glass sheets which comprises the following successive steps, namely, forming the sheet, inverting and depositing it upon another supporting-surface and pressing it between said supporting-surface and a die-surface; substantially as described.

3. The method of forming glass sheets which comprises the following successive steps, namely, forming the sheet, transferring it to another supporting-surface, and pressing it between the supporting-surface and a figured die-surface; substantially as described.

In testimony whereof I have hereunto set my hand.

FRANK L. O. WADSWORTH.

Witnesses:
JOHN MILLER,
H. M. CORWIN.